G. GOETZ.
METAL TURNING TOOL HOLDER AND TOOL.
APPLICATION FILED MAY 18, 1908.
946,599.
Patented Jan. 18, 1910.
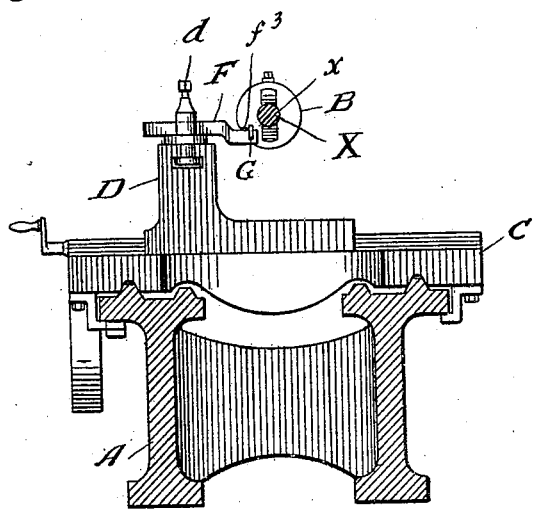
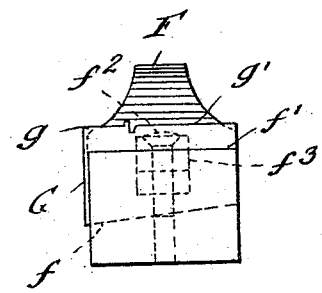
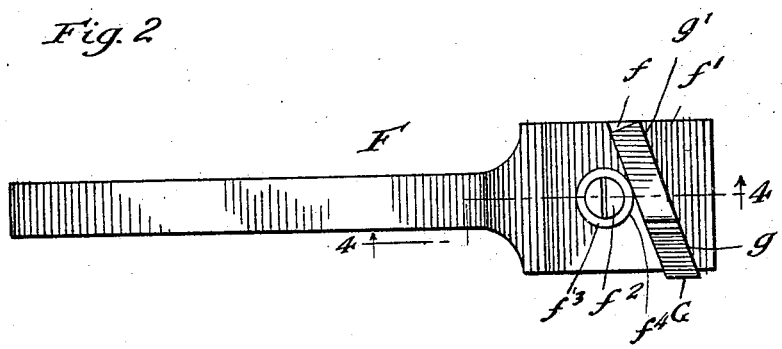
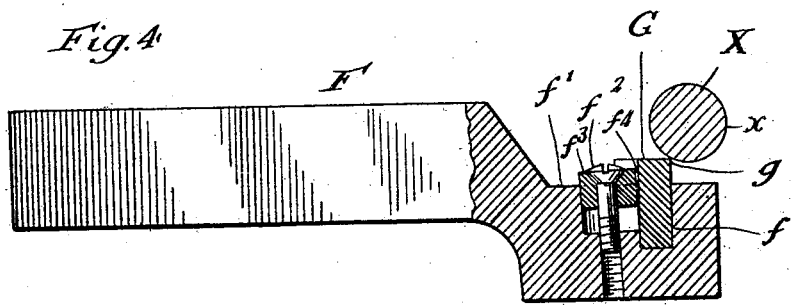
Witnesses:
Wm. Geiger
H. W. Munday
Inventor:
George Goetz
By Munday, Evarts, Adcock & Clarke
Attorneys

UNITED STATES PATENT OFFICE.

GEORGE GOETZ, OF CHICAGO, ILLINOIS, ASSIGNOR TO STREETER AMET WEIGHING AND RECORDING COMPANY, OF CHICAGO, ILLINOIS, A CORPORATION OF ILLINOIS.

METAL-TURNING TOOL-HOLDER AND TOOL.

946,599. Specification of Letters Patent. Patented Jan. 18, 1910.

Application filed May 18, 1908. Serial No. 433,394.

*To all whom it may concern:*

Be it known that I, GEORGE GOETZ, a citizen of the United States, residing in Chicago, in the county of Cook and State of Illinois, have invented a new and useful Improvement in Metal-Turning Tool-Holders and Tools, of which the following is a specification.

My invention relates to tool holders and tools for metal turning and shaping lathes. Its object is to provide a tool holder and tool for use in coöperation with a rotating chuck or work holder which will enable the work to be done more easily, rapidly and cheaply and at the same time increase the efficiency and durability of the tool.

My invention consists in the novel construction of parts and devices and in the novel combination of parts and devices herein shown and described and more particularly specified in the claim.

In the accompanying drawing, forming a part of this specification, Figure 1 is an end elevation, partly in vertical section, of a machine embodying my invention; Fig. 2 is a partial plan view; Fig. 3 an end view of the tool holder; Fig. 4 is a section on line 4—4 of Fig. 2 and is also a section of the work.

In the drawing A represents the frame, B the rotating chuck or work holder, C the longitudinal slide, D the cross transverse slide of a metal turner shaping lathe or machine.

F is the tool holder and G the shaping tool or knife, and X the stock or work to be cut or shaped thereby.

The tool holder F is secured to the cross slide D by the customary clamp screw $d$, and it is provided with a slot $f$ in the depressed upper face $f^1$ of the tool holder which extends at an angle to the axis of the rotating work holder B to receive the knife or tool G, which is secured in place in the tool holder by a clamp screw $f^2$ and collar $f^3$ having a wedge face $f^4$.

The knife or tool G has at its upper or operating face $g$ in a plane tangential to the finished face $x$ of the rotating stock or work X, while at the same time its cutting edge $g^1$ extends at an angle to the axis of the rotating work holder B, so that this inclined cutting edge of the tool G acts with a shearing cut upon the stock or work X. The tool G is preferably rectangular in cross section, and the slot or recess $f$ in the work holder F in which the tool G fits, is of corresponding shape.

In operation the tool holder is arranged or adjusted at the proper height to bring the operating face and cutting edge of the tool G on a level or in the same plane with the desired finished face $x$ of the work X, and then the tool and tool holder are reciprocated at right angles to the axis of the rotating work holder and with the operating face and inclined cutting edge tangential to the finished face $x$ of the work X, so that the tool G passes under or tangential to the work X, while at the same time the inclined cutting edge $g^1$ of the tool G is always at an angle to the work and to the axis of the work holder, so that the tool acts with a shearing cut, thus greatly increasing its capacity and rendering it far more durable.

I claim:

A tool holder having an inclined slot or recess to receive a tool, a tool mounted therein and having an upright flat face, and a clamp screw and collar, said collar having a wedging face engaging said flat face of said tool, substantially as specified.

GEORGE GOETZ.

Witnesses:
H. M. MUNDAY,
EDW. S. EVARTS.